United States Patent [19]

Moride et al.

[11] Patent Number: 5,038,288
[45] Date of Patent: Aug. 6, 1991

[54] VEHICLE DRIVING FORCE CONTROLLING MTHOD AND APPARATUS THEREFOR

[75] Inventors: Shigeki Moride; Shohachi Nakaya, both of Kanagawa; Kinji Ogino; Katsuya Miyake, both of Saitama, all of Japan

[73] Assignees: Fujitsu Limited, Kawasaki; Akebono Brake Industry Co., Ltd., Tokyo; Akebond Research and Development Centre Ltd., Hanyu, all of Japan

[21] Appl. No.: 456,793

[22] Filed: Dec. 27, 1989

[30] Foreign Application Priority Data

Dec. 27, 1988 [JP] Japan .................................. 63-330156

[51] Int. Cl.$^5$ ............................................ B60K 15/00
[52] U.S. Cl. .................................. 364/426.03; 180/197
[58] Field of Search ...................... 364/426.02, 426.03; 180/197; 303/95, 96, 100

[56] References Cited

U.S. PATENT DOCUMENTS

| | | | |
|---|---|---|---|
| 4,856,610 | 8/1989 | Leiber et al. | 180/197 |
| 4,866,618 | 9/1989 | Tamura et al. | 364/431.03 |
| 4,917,208 | 4/1990 | Komoda | 180/197 |
| 4,939,656 | 7/1990 | Hoashi et al. | 364/426.02 |

*Primary Examiner*—Thomas G. Black
*Attorney, Agent, or Firm*—Cushman, Darby & Cushman

[57] ABSTRACT

A vehicle driving force controlling apparatus provided with a non-driving wheel speed detector, a driving wheel speed detector, an accelerator pedal opening degree detector, and a controller for supplying a throttle instruction signal to the throttle valve on the basis of outputs of the non-driving and driving wheel detectors, and the controller varies a lowest limit of the throttle instruction signal according to an output of the accelerator pedal opening degree detector.

5 Claims, 3 Drawing Sheets

VEHICLE DRIVING FORCE CONTROLLING MTHOD AND APPARATUS THEREFOR

FIELD OF THE INVENTION

The present invention relates generally to a vehicle driving force controlling method and apparatus therefor. More particularly, the invention relates to a vehicle driving force controlling method and apparatus capable of suppressing a slip of the driving wheel of the vehicle by controlling an output of an engine upon detection of a slip of a driving wheel occurring at the time when the vehicle starts or accelerates.

BACKGROUND OF THE INVENTION

Recent vehicles are provided with electronic controllers for controlling throttle valves and other parts of engines on the basis of information from respective parts of the vehicles, such as accelerator pedal depressed degree (accelerator opening), selector (shift) lever gear selected position, throttle valve opening degree, engine revolution number, vehicle speed, cooling water temperature, and the like. Such is disclosed in U.S. Pat. No. 4,749,696 or Laid-open Japanese Patent Application (OPI) No. 63-36830.

FIG. 1 schematically shows a conventional automatic transmission type vehicle driving control system, which is provided with an engine 21, a dry single plate clutch 22, a synchromesh transmission 23, a pair of driving wheels 24, a pair of non-driving wheels 25, speed detectors 11 and 12 for the driving and non-driving wheels 24 and 25, respectively, an accelerator pedal 26, an accelerator pedal actuating degree (accelerator opening) detector 14, and a stepping motor 27 for opening/closing a throttle valve 28 installed in the engine 21.

The driving force control system is further provided with an electronic controller 15 for receiving information, such as accelerator opening degree, driving/non-driving wheel speed, and the like, and for supplying control signals to the stepping motor, the clutch and the transmission. The driving wheels and the non-driving wheels are provided with brake device (not shown). The electronic controller 15 may supply control signals to such braking systems.

In the case where a vehicle starts and/or accelerates on a slippery road surface, such as a wet, frozen or muddy road, the driving wheels often slips. Driving force control system is therefore provided to suppress the slip of the driving wheel for the purpose of improvement of starting and accelerating properties and running stability of the vehicle. This is one of functions in the electronic controller.

According to the driving force control system (often called "traction control system" or "engine output control system"), the throttle valve closes when the slip of the driving wheel is detected, and the throttle valve opens again when the slip is suppressed. The throttle valve closes and opens at a predetermined speed to the lowest limit when it closes and to the accelerator opening degree when it opens. The lowest limit is a value in which the throttle valve is not fully closed but slightly open (that is, a value considered to be sufficient to eliminate the slip). Further, the lowest limit is a constant value regardless of the accelerator opening degree.

Generally, it is considered that when the opening degree of the accelerator actuated by the driver is relatively large, the driver estimates the occurrence of a slip to some extent and, on the contrary, when the opening degree of the accelerator is relatively small, the driver estimates little occurrence of a slip. That is, the occurrence of a slip is inevitable at the time of the starting or accelerating of the vehicle, so that the vehicle cannot start or accelerate with no slip. When the accelerator depressing degree increases, the obtained driving force of the vehicle increases and, accordingly, the degree of the slip increases. When the degree of the slip reaches a predetermined value, the driving force becomes maximized, and when the degree of the slip exceeds the predetermined value, the driving force decreases. It is therefore necessary to suppress the slip to secure both driving force and steering controllability.

In the case where the lowest limit is constant, the throttle opening degree always takes the lowest value during the occurrence of the slip (that is, the slip rate becomes constant). Accordingly, in the case where the lowest limit is constant regardless of the accelerator opening degree, the will of the driver cannot be reflected in the driving force, so that the demand of the driver cannot be acceded by the conventional control apparatus.

SUMMARY OF THE INVENTION

It is an object of the present invention to eliminate a disadvantage accompanied in the conventional apparatus. Therefore, an object of the present invention is to provide a vehicle driving force controlling method and apparatus capable of reflecting a driver's will.

The above object can be achieved by a provision of a vehicle driving force controlling method comprising the steps of: monitoring a slip of a driving wheel occurring at the time when a vehicle starts or accelerates by slip detecting means; and supplying an output signal of a detector for detecting the opening degree of an accelerator depressed by a driver, to engine output control means which supplies an instruction value to close a throttle valve when a slip detection signal is generated by the detecting means, to thereby change the lowest limit of the throttle instruction value to be larger when the signal represents a large accelerator opening degree.

Further, the object of the invention can be achieved by a provision of a vehicle driving force controlling apparatus which is provided with a non-driving wheel speed detector, a driving wheel speed detector, an accelerator pedal opening degree detector, and a controller for supplying a throttle instruction signal to the throttle valve on the basis of outputs of the non-driving and driving wheel detectors, and the controller varies a lowest limit of the throttle instruction signal according to an output of the accelerator pedal opening degree detector.

The lower limit of the instruction value to open/close the throttle valve is changed corresponding to the accelerator opening degree with the accelerator opening detector detecting the opening degree of the accelerator pedal depressed by the driver at the time when the vehicle starts or accelerates. Therefore, the lower limit increases (so that the valve considerably opens even in the case where the valve is in the most closed state) as the accelerator opening degree increases and, on the contrary, the lower limit decreases as the accelerator opening degree decreases. Accordingly, the will of the driver can be reflected on the acceleration of the vehicle.

That is, in the case where the accelerator pedal is depressed deeply, the lowest limit of the instruction value to close the throttle valve becomes relatively high although the throttle valve is closed at the time of the detection of a slip. Accordingly, in this case, the valve is open so that large driving force is still produced by an engine of the vehicle. On the other hand, in the case where the accelerator pedal is not so deeply depressed down, the throttle lowest limit is lowered so that the driving force of the engine can be reduced sufficiently. In the former case, strong acceleration can be made while the wheels slip greatly. On the contrary, in the latter case, weak acceleration can be made while the driving wheels slip slightly. This reflects the will of the driver.

Other objects and features of the present invention will become apparent from the following description considered in connection with the accompanying drawings. It is to be understood, however, that the drawings are designed for illustration purposes only and does not limit as scope of the invention.

DESCRIPTION OF THE PREFERRED EMBODIMENT

The preferred embodiment of the invention will now be described with reference to FIGS. 2 to 5.

Figure 1:
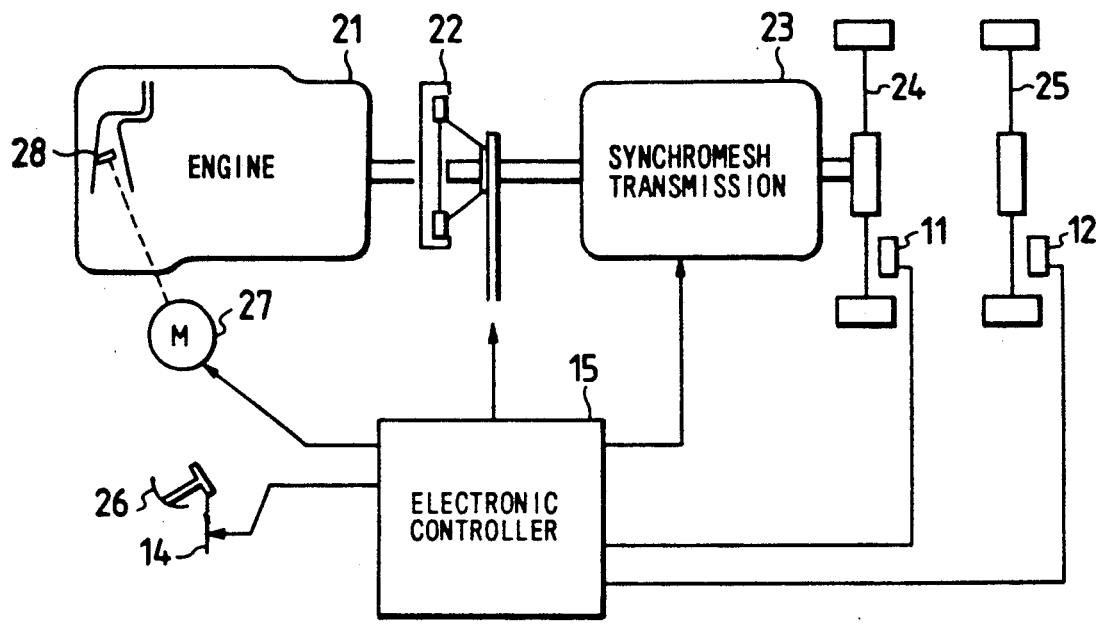
FIG. 1 is a schematic view showing a general vehicle driving control system.
Figure 2:
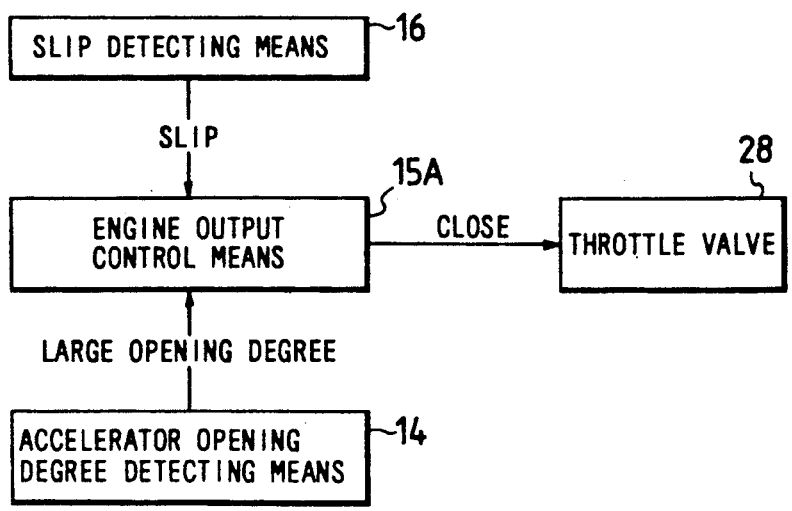
FIG. 2 is a block diagram explaining the theory of the present invention.

FIG. 2 is a block diagram explaining the theory of the present invention. In FIG. 2, a slip detecting means 16 outputs a slip signal, and an accelerator opening degree detecting means 14 outputs an accelerator opening degree. An engine output control means 15A controls a throttle valve 28 to open and close and varying a throttle lower limit on the basis of the outputs of the slip detecting means and the accelerator opening degree detecting means.

Figure 3:
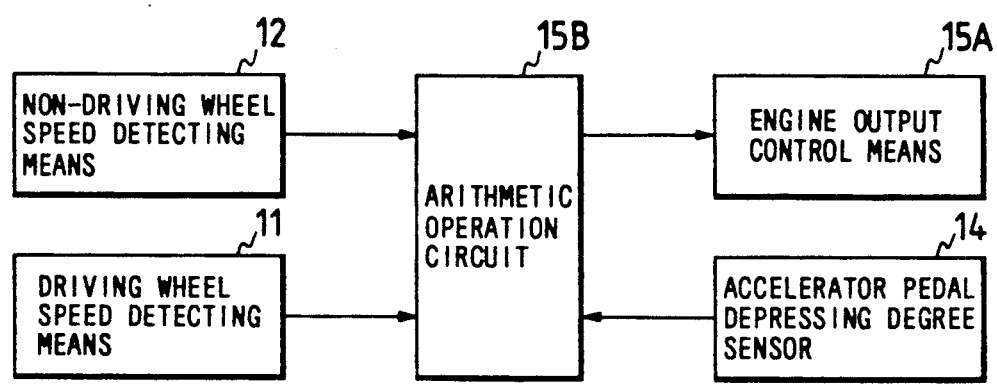
FIG. 3 is a schematic view showing an example of driving force control according to the present invention.
Figure 4:
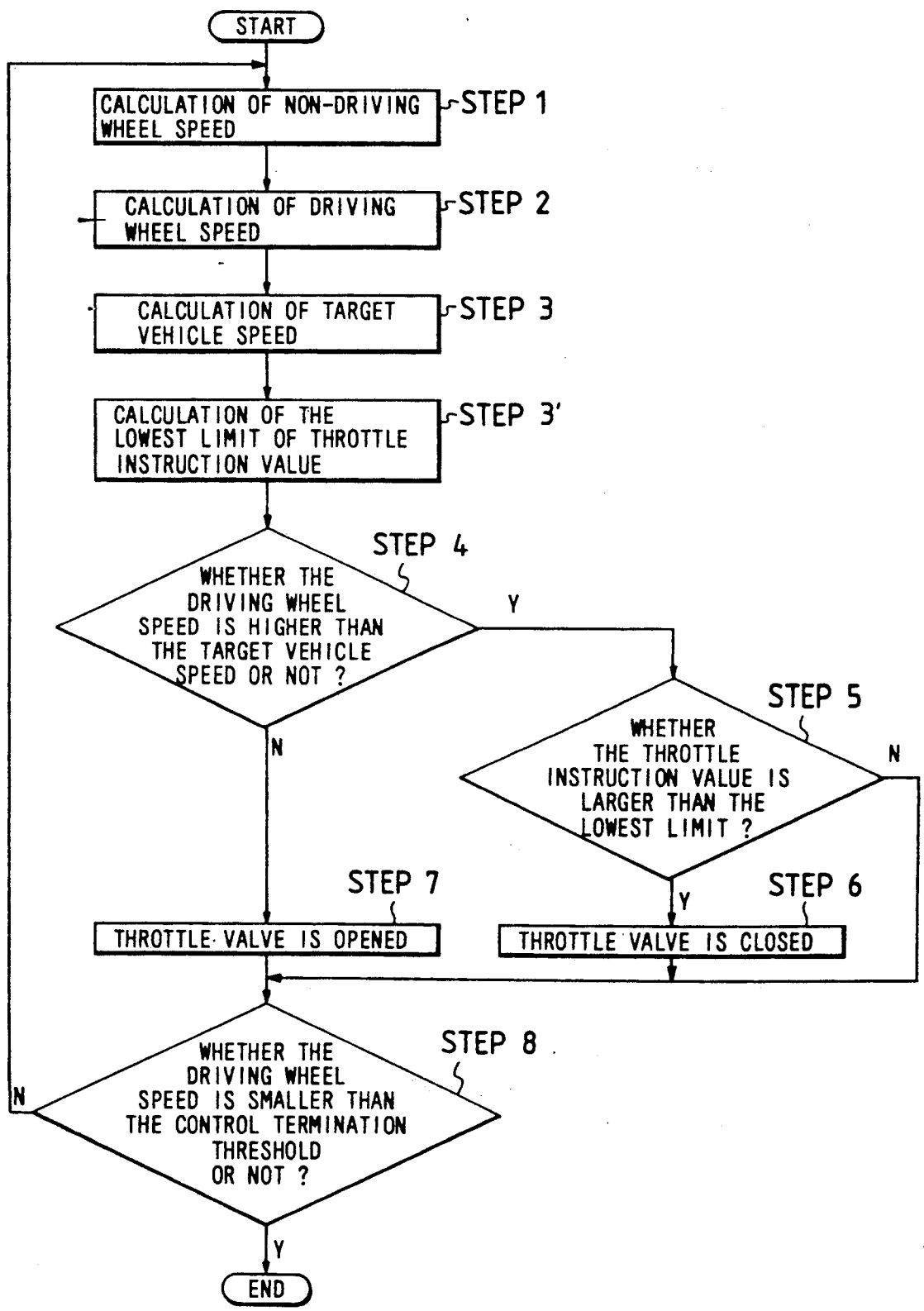
FIG. 4 is a flowchart explaining an operation of the example of the driving force control according to the present invention.

FIG. 3 is a block diagram showing an embodiment of the driving force control according to the present invention. FIG. 4 is a flowchart of the operation of the control of the invention shown in FIG. 3.

The driving force control system includes driving wheel speed detecting means 11, non-driving wheel speed detecting means 12, an arithmetic operation circuit 15B which receives the output signals of the detecting means 11 and 12 and performs detection of the presence/absence of the occurrence of a slip. The control system further includes an accelerator pedal depressing degree sensor 14 and engine output control means 15A for performing slip suppressing control. These engine output control means 15A and the arithmetic operation circuit 15B form a part of the aforementioned electronic controller.

The arithmetic operation circuit 15B receiving the output signals of the driving and non-driving wheel speed detecting means 11 and 12 performs calculation of the non-driving wheel speed (STEP 1) and calculation of the driving wheel speed (STEP 2) and then performs calculation of the target vehicle speed represented by the sum of the non-driving wheel speed and a first predetermined value (STEP 3) and calculation of the lowest limit of the throttle instruction value from the accelerator opening degree (STEP 3'). Then, a judgment is made as to whether the driving wheel speed is higher than the target vehicle speed or not (STEP 4). In general, the non-driving wheel speed can be considered to represent the vehicle speed (the ground speed of the vehicle).

In the case where the first predetermined value is determined in accordance with the slip to be suppressed, the fact that the driving wheel speed is higher than the target vehicle speed means the fact that the slip to be suppressed occurs. In this case, the situation is turned to STEP 5 to judge whether the throttle instruction value is larger than the lowest limit. When the value is larger, the throttle valve is closed by a predetermined amount. Then, a judgment is made as to whether the driving wheel speed is smaller than the control termination threshold (STEP 8). When the result of the judgment is "NO", the situation is returned to the initial step, that is, STEP 1.

The control termination threshold is also represented by the sum of the non-driving wheel speed and a second predetermined value. The second predetermined value is smaller than the first predetermined value used in STEP 3. Accordingly, in the case where the driving wheel speed is smaller than the control termination threshold, the slip control is terminated because the slip control becomes unnecessary. While the driving wheel speed is equal to or larger than the control termination threshold, the procedures in STEPs 1, 2, . . . are repeated.

In the present invention, the lowest limit used in STEP 5 is changed corresponding to the acceleration opening degree. Accordingly, when the driver depresses the accelerator down deeply, the lowest limit is increased so that the result of the judgment in STEP 5 is turned to "NO" before the throttle valve is completely closed, so that the throttle valve cannot be closed any more. Accordingly, the vehicle can started or accelerate with large driving force while the vehicle slips relatively greatly. When the driver does not so deeply depress the accelerator down, the STEP 5 judges "YES" and, therefore, the throttle valve is sufficiently closed.

Figure 5:
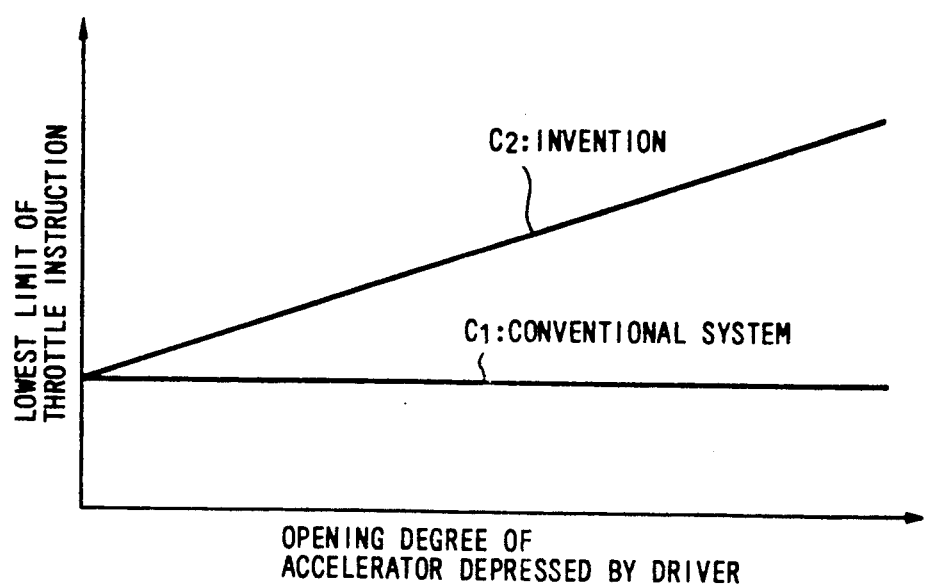
FIG. 5 is a graph showing a throttle instruction.

FIG. 5 shows the relation between the opening degree of the accelerator depressed down by the driver and the lowest limit of the throttle instruction value. In the drawing the line $C_1$ represents a lowest limit corresponding to a conventional method in which the lowest limit is constant regardless of the accelerator opening degree. The line $C_2$ shows a lowest limit corresponding to the method of the present invention in which the lowest limit is changed in accordance with the accelerator opening degree.

Other than described above, various changes and arrangements may be applicable without exceeding a scope of the invention. For example, the engine output control means 15A and the arithmetic operation circuit 15B may consist of a
microcomputer.

As described above, according to the present invention, the lowest limit of the throttle instruction value is determined in accordance with the opening degree of the accelerator depressed down by the driver. Accordingly, driving force control to obtain a feeling of a slip near to the will of the driver can be made.

What is claimed is:

1. Method for controlling a driving force of a vehicle comprising a throttle valve, an accelerator, a driving wheel a non-driving wheel a driving wheel speed detector, a non-driving wheel speed detector, and an accelerator pedal depression degree sensor, the method comprising the steps of:

(1) generating a throttle opening signal which controls the degree of opening of the throttle valve based on a throttle instruction value, the degree of opening controlling the driving force of the vehicle;

(2) generating by the non-driving wheel speed detector, a signal indicature of non-driving wheel speed;

(3) calculating based on the signal from the non-driving wheel speed detector; a speed of the non-driving wheel of the vehicle;

(4) generating by the driving wheel speed detector, a signal indicative of speed of the driving wheel;

(5) calculating based on the signal from the driving wheel speed detector, a speed of the driving wheel of the vehicle;

(6) calculating a target speed of the vehicle on the basis of said non-driving wheel speed and a first predetermined value;

(7) generating a signal indicative of accelerator pedal position;

(8) calculating a throttle lowest limit based on the signal from the accelerator pedal depressing sensor, where said throttle lowest limit is a monotonically increasing linear function of the opening degree of the accelerator;

(9) judging whether said driving wheel speed is larger than said target vehicle speed, proceeding to step (10) if said driving wheel speed is larger than said target vehicle speed, and proceeding to step (11) if said driving wheel speed is lower than target vehicle speed;

(10) judging whether a throttle instruction value corresponding to said throttle opening signal is larger than said lowest limit, closing the throttle valve only if said throttle opening signal is larger than said lowest limit, and proceeding to step (12);

(11) opening the throttle valve in accordance with the throttle opening signal, and thus, the throttle instruction value;

(12) calculating a control terminate threshold value on the basis of said non-driving wheel speed and a second predetermined value;

judging whether said control terminate threshold value is larger than said driving wheel speed; and

(14) terminating the control when said control terminate threshold value is larger than said driving wheel speed, else proceeding to step (1).

2. The method according to claim 1, wherein said second predetermined value is smaller than said first predetermined value.

3. Apparatus for controlling a driving force of a vehicle having an accelerator pedal, and a driving and non-driving wheels, the apparatus comprising:

means for generating a throttle opening signal which controls the degree of opening of the throttle valve based on a throttle instruction value, the degree of opening controlling the driving force of the vehicle;

means for generating a signal indicative of non-driving wheel speed;

means for calculating non-driving wheel speed based on the driving wheel speed signal;

means for generating a signal indicative of driving wheel speed;

means for calculating driving wheel speed based on the output signal from the driving wheel speed signal;

means for calculating a target speed of the vehicle on the basis of said non-driving wheel speed and a first predetermined value;

means for generating a signal indicative of a degree to which the accelerator pedal is pressed;

means for calculating a throttle lowest limit based on the accelerator pedal signal, where said throttle lowest limit is a monotonically increasing linear function of the opening degree of the accelerator;

means for judging whether said driving wheel speed is larger than said target vehicle speed;

means for judging whether a throttle instruction value corresponding to said throttle opening signal is larger than said lowest limit, and for closing the throttle valve only is said throttle opening signal is larger than said lowest limit;

means for opening the throttle valve in accordance with the throttle opening signal, and thus, the throttle instruction value when said driving wheel speed is lower than said target vehicle speed;

means for calculating a control terminate threshold value on the basis of said non-driving wheel speed and a second predetermined value;

means for judging whether said control terminate threshold value is larger than said driving wheel speed; and means for terminating the control when said control terminate threshold value is larger than said driving wheel speed.

4. The apparatus according to claim 3, wherein said throttle opening signal generating means, said non-driving wheel speed signal means, said mean for calculating a speed of the driving wheel, said means for calculating a target speed of the vehicle, and said means for calculating a throttle lowest limit are incorporated into a programmed microcomputer.

5. A vehicle driving force controlling method comprising the steps of:

monitoring a slip of a driving wheel of the vehicle occurring at the time when the vehicle starts or accelerates;

when slip is detected, supplying a throttle opening signal to a throttle valve, the throttle opening signal reflecting the value of a throttle instruction value, to close the throttle valve to thereby decreasing the driving force and suppressing slip of said driving wheel;

detecting the opening degree of an accelerator depressed down by a driver; and changing the lowest limit of said throttle instruction value corresponding to the accelerator opening degree so that the lowest limit of said throttle instruction value is a monotonically increasing linear function of the opening degree of the accelerator.

* * * * *

UNITED STATES PATENT AND TRADEMARK OFFICE
CERTIFICATE OF CORRECTION

PATENT NO. : 5,038,288
DATED : August 6, 1991
INVENTOR(S) : Shigeki Moride, Shohachi Nakaya, Kinji Ogino and Katsuya Miyake It is certified that error appears in the above-identified patent and that said Letters Patent is hereby corrected as shown below:

ON THE TITLE PAGE:

Please change:

"Assignee Fujitsu Limited . . . . . AKEBOND RESEARCH AND DEVELOPMENT CENTRE LTD., . . . .

to

--- Assignee: Fujitsu Limited . . . . . AKEBONO RESEARCH AND DEVELOPMENT CENTRE LTD., . . .

Signed and Sealed this

Twentieth Day of October, 1992

Attest:

DOUGLAS B. COMER

*Attesting Officer*     Acting Commissioner of Patents and Trademarks